United States Patent [19]
Andrew et al.

[11] Patent Number: 5,439,331
[45] Date of Patent: Aug. 8, 1995

[54] HIGH PRESSURE TAPPING APPARATUS

[75] Inventors: Bill D. Andrew, Tulsa; William D. Duwe, Broken Arrow; Michael L. Wilson, Tulsa, all of Okla.

[73] Assignee: TDW Delaware, Inc., Wilmington, Del.

[21] Appl. No.: 220,730

[22] Filed: Mar. 31, 1994

[51] Int. Cl.⁶ .............................................. B23B 41/08
[52] U.S. Cl. ................................... 408/8; 408/101
[58] Field of Search ............... 408/8, 12, 72 R, 95, 408/101, 137, 138; 137/318

[56] References Cited

U.S. PATENT DOCUMENTS

| | | | |
|---|---|---|---|
| 2,679,173 | 5/1954 | Will | 408/101 |
| 3,374,521 | 3/1968 | Clarke | 29/157 |
| 3,614,252 | 10/1972 | Rose et al. | 408/9 |
| 3,703,909 | 11/1972 | Erb | 137/318 |
| 3,804,545 | 4/1974 | Chistov et al. | 408/101 |
| 4,093,393 | 6/1978 | Smith et al. | 408/137 |
| 4,515,287 | 5/1985 | Baudoux | 220/316 |
| 4,579,484 | 4/1986 | Sullivan | 408/56 |
| 4,626,142 | 12/1986 | Brin | 408/81 |
| 4,880,028 | 11/1989 | Osburn | 137/315 |

*Primary Examiner*—Daniel W. Howell
*Attorney, Agent, or Firm*—Head & Johnson

[57] ABSTRACT

An apparatus for tapping an opening into an existing pipeline that is under internal pressure including an elongated tapping machine body having means on one end for attachment to a pipeline, a boring bar having a rotatable feed screw therein by which the boring bar is axially positioned, and a pressure responsive valve actuated by differential pressure between the interior of a pipeline and the interior of the tapping machine body to control hydraulic pressure inside the tapping machine body to thereby counterbalance the hydraulic force applied to the boring bar.

4 Claims, 3 Drawing Sheets

HIGH PRESSURE TAPPING APPARATUS

CROSS-REFERENCE TO RELATED APPLICATIONS

This application is not related to any co-pending patent application.

BACKGROUND OF THE INVENTION

Description Of The Prior Art

The use of tapping machines for tapping openings in pipelines is well known. Prior issued U.S. Pat. No. 3,614,252 entitled "Tapping Apparatus"; U.S. Pat. No. 4,579,484 entitled "Underwater Tapping Machine"; and U.S. Pat. No. 4,880,028 entitled "Completion Machine" are exemplary of such devices. The contents of these prior issued United States patents are incorporated herein by reference.

The prior patents illustrate and describe techniques for tapping into a pipeline while under pressure without interrupting transportation of gases or liquids through the pipeline. Although the basic operation as set forth below remains the same, this invention improves the operation in several ways, as set forth below, that work to increase the tapping apparatus' operating range and to provide energy efficient speed controls.

SUMMARY OF THE INVENTION

Cutting an opening in the wall of a pipeline is difficult and time consuming and requires well engineered and constructed tapping equipment which must withstand the rigors of cutting through heavy gauge steel while under pressure. It is known that pressure from a pipeline acts against the tapping apparatus, thus reducing the cutting rate while increasing operating loads across the internal working mechanisms of the apparatus. The increased wear and tear on the tapping apparatus reduces its efficiency and useful life. The present invention is directed toward a means by which tapping apparatuses can work more efficiently and effectively when cutting into a pipeline with high existing pressures.

Existing designs of tapping apparatuses are limited in their performance by high pipeline pressures. Pipeline pressure acts on the projected area of the tapping apparatus boring bar and generates a load across the apparatus feed screw and nut. The feed screw mechanism is the primary means of advancing a boring cutting bit into a pipeline. Increasing the load across the feed screw requires higher input torques to operate the equipment. The higher loads result in increased stress throughout the structural members of the tapping apparatus that may eventually result in premature failure.

An object of this invention is to provide a tapping apparatus that will reduce operating loads across the feed screw, thus reducing the amount of torque required to operate the tapping apparatus at higher pipeline pressures. This is accomplished by using hydraulic power, gas power or even existing pipeline gas pressure or the like inside the tapping machine body. The supply of pressure acts on the projected area of the boring bar and generates a load across the feed screw and nut and related thrust bearings. This load counterbalances the opposing pressure released from the pipeline, which reduces the overall input torques required to operate the equipment. This in turn reduces stress ordinarily imposed throughout the structural members, thus reducing premature failure of key components.

A further object of this disclosure is to provide a more energy efficient speed control. Currently the rotating speed of the boring bar is controlled by the power unit pump shaft speed. Two main problems exists with this method: (1) the operator must adjust the rotating cutting speed via the power unit by adjusting the power unit's speed; and (2) at slower cutting speeds, the power unit engine may not perform at the optimal level necessary to generate sufficient torque to penetrate the pipeline.

The present invention utilizes a load sensing pump and circuitry that sets and maintains the rotating cutting speed at a substantially constant speed that is independent of the engine speed. Load sensing pumps of this type maintain a constant pressure differential between the pressure required to operate the load and the pump outlet pressure. The flow, in turn, is proportional to the pressure control valve opening regardless of the pump shaft speed.

These and other objects, advantages and features of this invention will be apparent to those skilled in the art after consideration of this specification, including the attached drawings and appended claims.

DESCRIPTION OF THE PREFERRED EMBODIMENTS

Figure 1A:
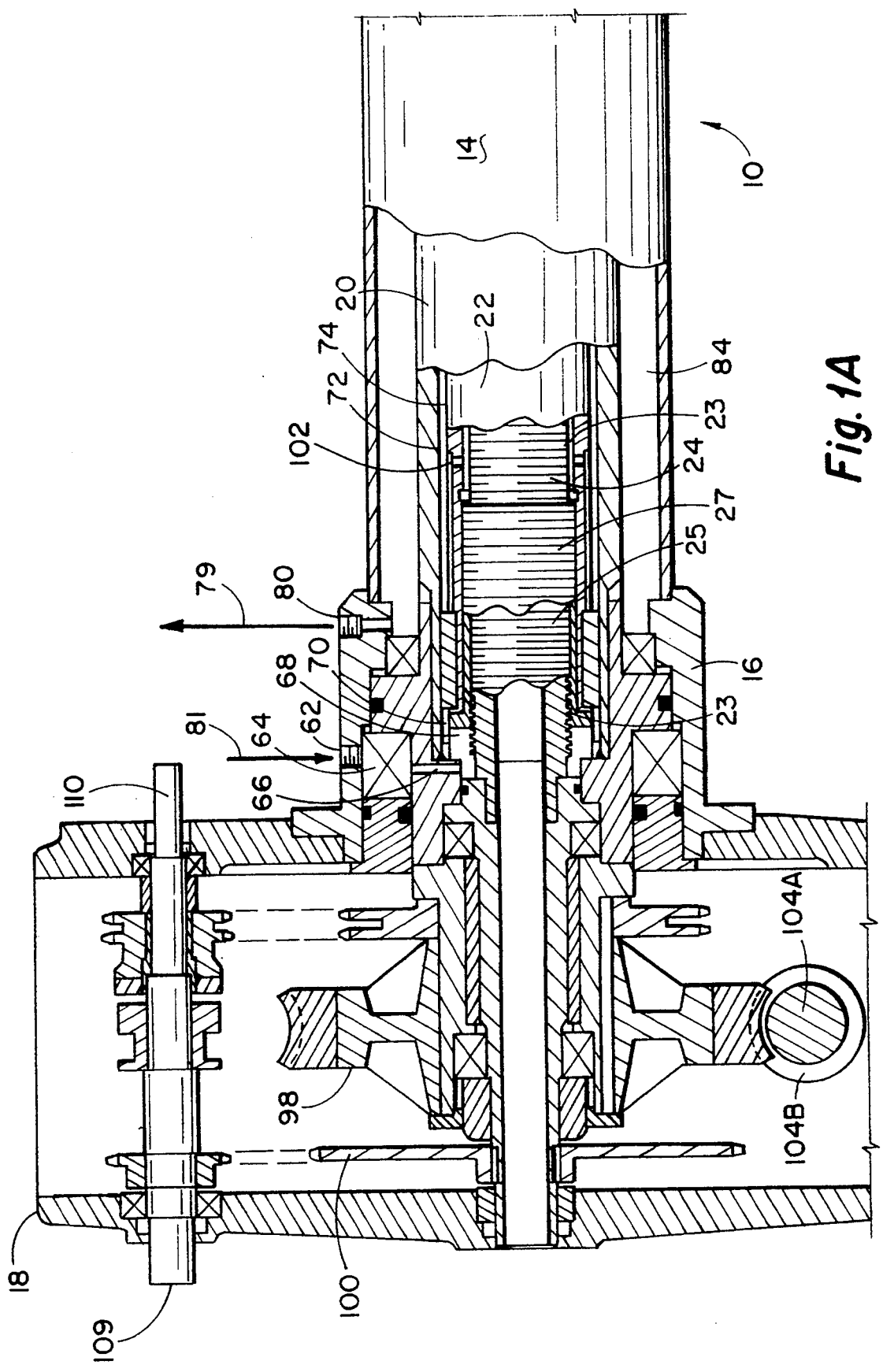
FIGS. 1A and 1B represent an external view of a tapping apparatus employing the principles of this invention, shown partially in cross-section.
Figure 1B:
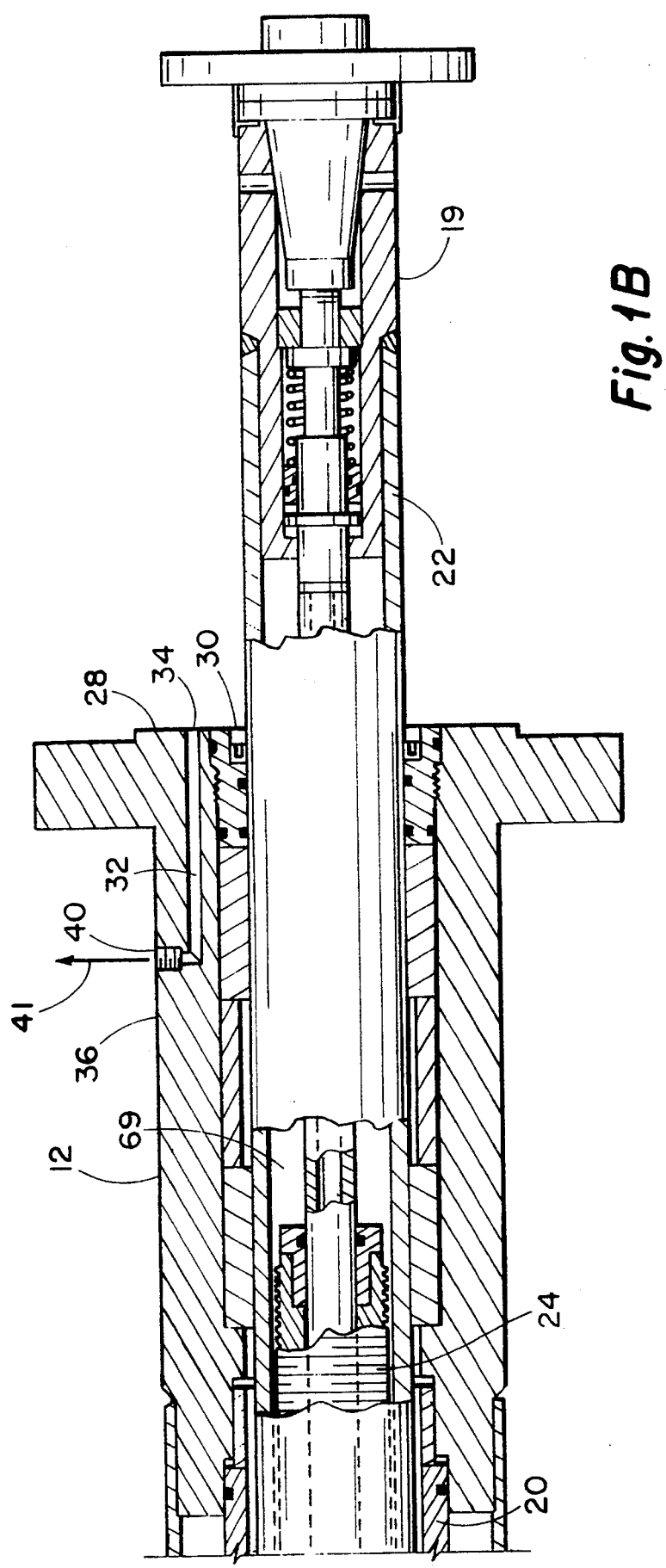

Referring to the drawings and first to FIGS. 1A and 1B, the hot tapping apparatus of this invention is illustrated partially cut-away. The manner of attaching tapping machines to pipelines is well known. Prior issued U.S. Pat. No. 4,880,028 entitled "Completion Machines" is exemplary of such attachment. The contents of this prior issued United States patent is incorporated herein by reference. For a detailed description of such attachment, see FIGS. 1A and 1B and Col. 3, lines 10–31 of U.S. Pat. No. 4,880,028.

Referring first to FIGS. 1A and 1B, a hot tapping apparatus is generally indicated by the numeral 10. The apparatus includes a lower tubular member 12, a tubular housing portion 14, a collar portion 16, a gear housing 18 and a cutter portion 19. Positioned concentrically in and coaxially with housing member 14 and tubular member 12 is a drive tube 20. Positioned concentrically in and coaxially with drive tube 20 is a boring bar 22. Positioned concentrically in and coaxially with boring bar 22 is a feed screw mechanism 24.

When a pipeline to be tapped has fluid pressure therein such fluid pressure causes a load on the tapping apparatus components. When cutter portion 19 cuts into a pipeline (not shown) to be tapped, the pipe pressure is upwardly exerted against the lower ends of boring bar 22 and feed screw mechanism 24. This pipe pressure works against the downward force of the boring bar and the feed screw as a cutter (not shown) that is attached to cutter portion 19 cuts through the pipe wall (not shown). When sufficient force is applied to rotate boring bar 22 and feed screw 24, internal threads 25 of tubular drive member 27 mesh with the external threads 23 on the feed screw to axially advance boring bar 22.

Fluid pressure in the pipeline acts against the feed screw and therefore requires additional torque to rotate the feed screw.

The typical tapping apparatus as previously known does not contain any fluid or oil. However, in this invention fluid is placed within the tapping apparatus to reduce the load on the apparatus components, such as the boring bar and feed screw, caused by pipeline pressure. The fluid pressure within a pipeline being tapped is used to provide a hydraulic signal that is used to apply hydraulic pressure to components of the tapping machine to counter the upward pipe pressure. A reduction of the loads on the components achieved by balancing pressure across the components, such as the boring bar and feed screw, allows the tapping machine to operate more efficiently and effectively.

Lower tubular member 12 has a lower end 28 that is configured to attach to a plug (not shown) that, in turn, attaches to a pipeline (not shown) to be tapped. Lower end 28 has a tubular opening 30 that receives boring bar 22 and a small diameter opening 34 communicating with a passageway 32. Fluid pressure at opening 34 from a pipeline being tapped communicates through passageway 32 to opening 40 which receives a conduit 41 which connects with a sensing means 54 (See FIG. 2). Sensing means 54 senses the amount of pipe pressure present at inlet 34 and by opening or closing fluid flow paths in the sensing means regulates the flow of fluid under pressure to inlet opening 62 in collar portion 16 (FIG. 1A).

Regulated fluid from sensing device 54 enters opening 62, infiltrates drive bearings 64, and flows through passageway 66 that is in communication with a reservoir area 68. The regulated fluid in reservoir area 68 applies a downward pressure against feed screw mechanism 24 and boring bar 22 and helps balance the tension imposed on bearings 64.

Regulated fluid also enters longitudinal passageway 70 from reservoir area 68 located between an inner sidewall 72 of drive tube 20 and an outer sidewall 74 of boring bar 22. The regulated fluid in passageway 70 communicates with passageway 102 to allow regulated fluid pressure into area 69. Fluid pressure within area 69 helps to counter the upward fluid pipeline pressure applied against boring bar 22. This further reduces the screw feed load and consequently reduces the torque required to operate the feed screw to advance the boring bar.

Figure 2:
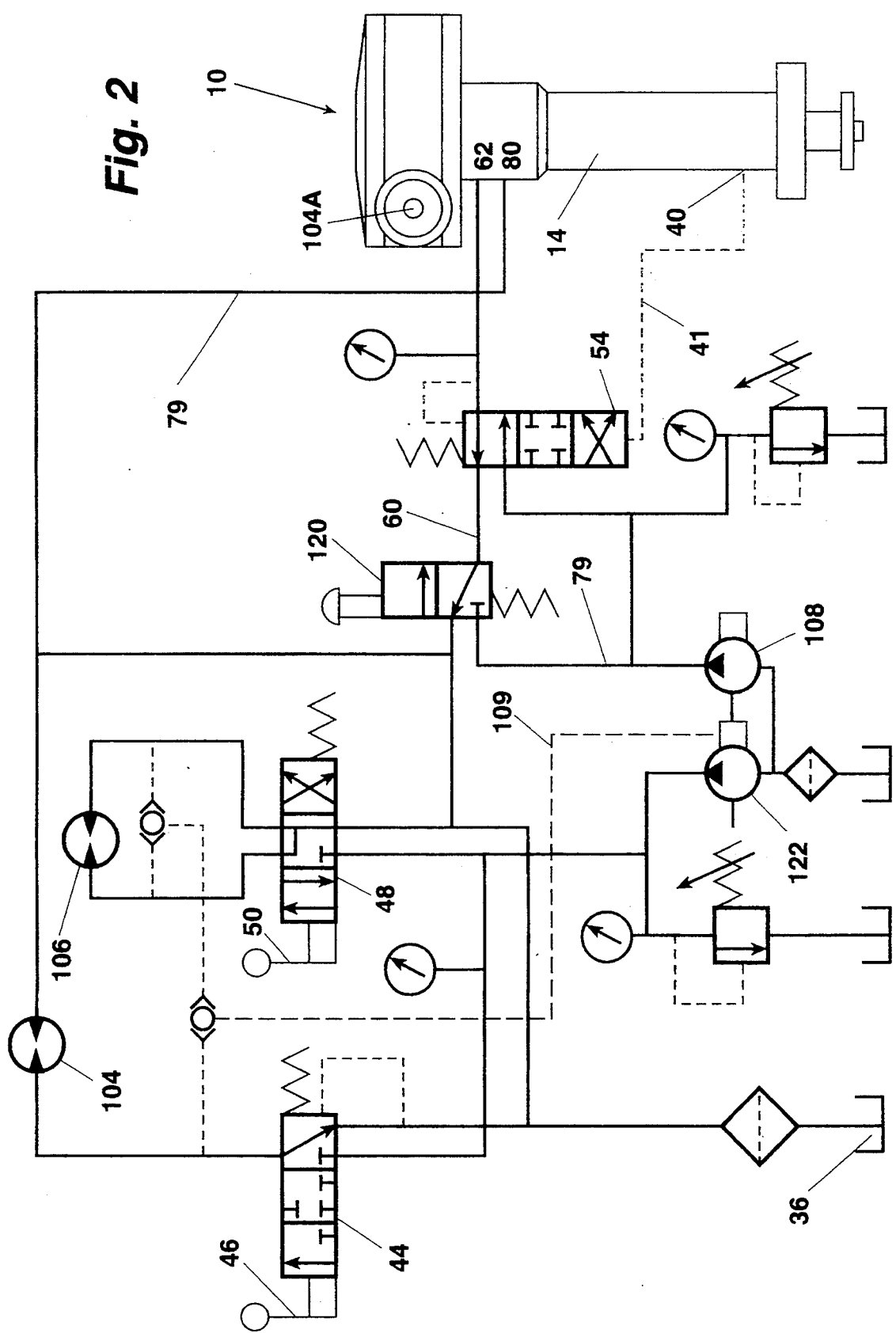
FIG. 2 is a schematic view of the hydraulic system of the tapping apparatus illustrating the flow of hydraulic fluid for various operations performed by the apparatus during a tapping operation.

Pressure in annular area 84 is released through opening 80 and second conduit 79 back to a hydraulic fluid sump as shown in FIG. 2.

OPERATION OF THE TAPPING APPARATUS

Referring to FIG. 2, pump 108 supplies hydraulic fluid pressure used to maintain pressure within the interior of the tapping apparatus housing 14, the pressure being applied to opening 62. By means of conduit 41 pressure is applied to sensing device 54. The position of sensing device 54 is controlled by pressure within a pipeline being tapped as soon as the cutter (not shown) penetrates the pipeline. The pipeline pressure is applied from opening 40 by conduit 41 to control the position of sensing device 54.

Sensing device 54 has three positions controlled by pressure differential across the device. When the pressure at openings 40 and 62 are the same, sensing device 54 is in the middle position and no pressure from pump 108 is applied to the tapping apparatus. When the pressure at opening 40 exceeds that within the tapping apparatus as revealed at opening 62, sensing device 54 shifts so that pressure from pump 108 is applied to opening 62. When this pressure equalized that of the pipeline interior, as revealed at opening 40, sensing device 54 shifts to the middle or closed position. When pressure within the tapping apparatus exceed that at opening 40 (the pipeline pressure after a pipeline has been penetrated) sensing device 54 returns to the illustrated position as shown in which opening 62 is connected to a hydraulic sump 36 to thereby drain fluid from within the tapping apparatus. When pressure at openings 40 and 62 is again balanced, the sensing device returns to the middle position. Thus, sensing device 54 automatically regulates the pressure within the interior of the tapping apparatus to balance the hydraulic forces applied against the boring bar. This means that the feed screw does not have to counter the force caused by the pipeline pressure during a boring operation.

Test valve 120 may be manually depressed before the tapping apparatus is put in service to apply hydraulic pressure from pump 108 to the interior of the tapping apparatus by way of conduits 60 and 79 to test the seals against leakage. Otherwise, valve 120 is not involved in the automatic pressure balancing feature of the tapping apparatus.

Pump 122 supplies hydraulic pressure to actuate hydraulic motor 104 that rotates boring bar 22 and hydraulic motor 106 that rotates drive train mechanism 109, 110, 100 (See FIG. 1A) that rotates feed screw 24.

Rotation of the boring bar is controlled by valve 44 manually positioned by lever 46. One side of hydraulic motor 104 is always connected to fluid sump 36. In the position of valve 44 illustrated, both sides of motor 104 are connected to sump 36 so motor 104 is not actuated. However, when lever 46 is pushed to move valve 44 to the far right position, hydraulic force from pump 122 is applied to motor 104 to turn shaft 104A to rotate a worm gear 104B which in turn rotates gear 98 (See FIG. 1A) and thereby boring bar 22. The speed of rotation of the boring bar is controllable by the operator controlling the position of valve 44.

Valve 48 controls the direction of rotation of motor 106 and thereby the direction and speed of rotation of feed screw 24. The position of valve 48 is controlled manually by the position of lever 50. The speed of rotation of the drive screw controls the advancement or the withdrawal of the boring bar. That is, when feed screw 24 turns faster than boring bar 22, the boring bar is advanced. When feed screw 24 turns slower than boring bar 22, the boring bar is withdrawn. More specifically, a chain-sprocket drive is used to rotate feed screw 24 positioned inside boring bar 22. Threads on the feed screw engage the boring bar and both are rotating due to the hydraulic drive motor and chain-sprocket assemblies. The chain-sprocket drive is designed such that the feed screw turns slightly faster than the boring bar. Speed differential between the two causes the feed screw to advance or withdraw the boring bar.

Valves 44 and 48 are not snap action but are continuously variable in the opening of their internal passageways. As the operator positions these valves (independently and not at same time) fluid pressure from pump 122 is communicated to hydraulic motors 104 and 106, respectively. Fluid pressure supplied to these motors is communicated back to pump 122 flow control mechanism through conduit 109. Pump 122 flow control mechanism, commonly known in the fluid power industry as the load-sensing type, adjusts pump output flow to maintain a constant pressure difference between its outlet pressure and the pressure in conduit 169. As valve 44 or 48 is opened further, pump 122 supplies more flow to maintain the constant pressure difference. Hence, variable speed control of motors 104 and 106 is obtained independently of pump 122 shaft speed (engine speed) and only the pressure required to rotate the hydraulic motors 104 and 106 is supplied.

As has been described, the tapping tool is a device that enables one to perform a machining operation of drilling a hole into an existing pipeline. A drive train of gears, sprockets, and feed screw provide the mechanical actions required to rotate and advance the cutting drill bit.

Once a tap has been completed a clutch in the drive train is disengaged and the boring bar can be extended or retracted by operating the feed motor 106 which turns feed screw 24 only and rapidly extends or retracts boring bar 22.

Operation of the tapping tool is limited by the pressure in the pipeline that the tap is penetrating. The pressure acts on the projected area of the boring bar and generates a load on the feed screw and related thrust bearings. Sufficient torque must be applied to the feed screw by the feed motor to overcome the load to either extend or retract the boring bar. The limiting factor becomes the available torque from the feed motor to operate the tool by applying hydraulic pressure inside of the boring bar the opposing force from the pipeline pressure is counteracted. This reduces the feed screw load and consequently reduces the torque required to operate the tapping apparatus at maximum pipeline pressures. The combination of a feed screw and hydraulically assisted boring bar creates a tapping tool that uses hydraulics to provide the operating thrust and the feed screw to mechanically control the advance rate of the boring bar and cutter.

Hydraulic pressure is restrained within the tool body by various hydraulic seals. Strategic placement and sizing of the seals can reduce the loads on the various bearings. The reduction in loads allows the tool to operate in higher pressure pipelines using the same or smaller components than previous designs.

Pressure inside the tapping tool is supplied by a pressure source 108. As previously described, this pressure is controlled using pressure control valve 54 that adjusts tapping tool pressure based on the pipeline pressure sensed at opening 34 at the lower end of tapping device housing.

By using a special load sensing pump 122 and hydraulic circuitry it is possible to set and maintain rotating cutting speed at a constant and preset level independent of the speed at which the pump is driven. Such load sensing pumps of this type maintain a constant pressure differential between the pressure required to operate the load and the pump outlet pressure. Flow becomes proportional to control valve opening regardless of pump shaft speed.

Thus, it can be seen from the above description the apparatus of this disclosure is designed to provide a counter force to the pressure in a pipe to be tapped. The counter force is generated by applying fluid pressure on a projected area inside the tapping apparatus that opposes the projected area of the boring bar subjected to pipeline pressure. A load is then generated opposite to the direction of the load generated by a pipeline pressure on the boring bar.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for tapping an opening into an existing pipeline or the like under high internal pressure, comprising:

an elongated tapping machine body having a means on the lower end for attachment to a pipeline that is to be tapped;

a feed screw positioned longitudinally inside the tapping machine body that rotates about its longitudinal axis;

a boring bar connected to the feed screw for axial movement relative to the boring bar upon relative rotation of the feed screw and boring bar, the boring bar having means for attachment to a cutter for rotation by the boring bar and for movement by the boring bar into and out of engagement with a pipeline;

means for rotating said feed screw;

a means for rotating said boring bar to tap a pipeline when moved into engagement therewith by the relative rotation of said feed screw and said boring bar;

means for sensing pipeline pressure;

means to control hydraulic fluid pressure inside said tapping machine body based upon said pipeline pressure to at least in part balance the forces applied to said boring bar; and means for controlling the speed of rotation of said feed screw and said boring bar.

2. An apparatus according to claim 1 wherein said boring bar is tubular having a central longitudinally extending opening into which said feed screw extends.

3. An apparatus for tapping an opening into an existing pipeline or the like, comprising:

an elongated tapping machine body having a boring bar having means to receive a cutter, the boring bar being movable axially to move a cutter into and out of engagement with a pipeline;

means to move said boring bar axially;

means to sense pipeline hydraulic pressure; and means responsive to said pipeline hydraulic pressure to control hydraulic pressure inside said tapping machine to at least in part balance the forces applied to the boring bar during a cutting operation.

4. An apparatus according to claim 3 wherein said means responsive to said pipeline hydraulic pressure is a pressure actuated valve responsive to differential pressure between a pipeline and the interior of said tapping machine body.

* * * * *